(12) United States Patent
Gu et al.

(10) Patent No.: US 10,107,315 B2
(45) Date of Patent: Oct. 23, 2018

(54) MEMS PRESSURE SENSORS WITH INTEGRATED BAFFLES

(71) Applicant: MKS Instruments, Inc., Andover, MA (US)

(72) Inventors: Lei Gu, Lexington, MA (US); Stephen F. Bart, Newton, MA (US)

(73) Assignee: MKS Instruments, Inc., Andover, MA (US)

( * ) Notice: Subject to any disclaimer, the term of this patent is extended or adjusted under 35 U.S.C. 154(b) by 666 days.

(21) Appl. No.: 14/101,207

(22) Filed: Dec. 9, 2013

(65) Prior Publication Data
US 2014/0318656 A1    Oct. 30, 2014

Related U.S. Application Data

(60) Provisional application No. 61/817,713, filed on Apr. 30, 2013.

(51) Int. Cl.
| | |
|---|---|
| *G01L 19/06* | (2006.01) |
| *F15D 1/00* | (2006.01) |
| *G01L 19/00* | (2006.01) |

(52) U.S. Cl.
CPC ........ *F15D 1/0005* (2013.01); *G01L 19/0007* (2013.01); *G01L 19/0627* (2013.01); *G01L 19/0636* (2013.01); *Y10T 29/49* (2015.01)

(58) Field of Classification Search
CPC ........................... F15D 1/0005; G01L 19/0636
See application file for complete search history.

(56) References Cited

U.S. PATENT DOCUMENTS

| | | | | |
|---|---|---|---|---|
| 5,954,577 A | * | 9/1999 | Meckler | ............... B60H 3/0625 454/158 |
| 6,443,015 B1 | | 9/2002 | Poulin et al. | |

(Continued)

FOREIGN PATENT DOCUMENTS

| | | |
|---|---|---|
| CN | 202598113 | 12/2012 |
| JP | 2003-508780 A | 3/2003 |

(Continued)

OTHER PUBLICATIONS

International Search Report and the Written Opinion dated Jan. 22, 2016 from the corresponding PCT Application No. PCT/US2014/034908.

(Continued)

*Primary Examiner* — Lisa Caputo
*Assistant Examiner* — Herbert K Roberts
(74) *Attorney, Agent, or Firm* — Cesari and McKenna, LLP (57) ABSTRACT

A pressure sensor system may sense the pressure of a gas or liquid. The system may include a housing that has an entry port for the gas or liquid; a pressure sensor within the housing; and a baffle positioned between the entry port and the pressure sensor. The baffle may have one or more inlets oriented to receive gas or liquid that enters the entry port; one or more outlets oriented to deliver the received gas or liquid to the pressure sensor; and one or more sealed flow channels that prevent the gas or liquid from escaping from the baffle, other than through the one or more outlets. At least one of the outlets may be located within no more than one millimeter of a location on the pressure sensor. The pressure sensor and baffle may be made at the same time during a process of depositing, pattering, etching, wafer bonding, and/or wafer thinning a series of layers using microelectromechanical systems (MEMS) technology.

29 Claims, 8 Drawing Sheets

(56) References Cited

U.S. PATENT DOCUMENTS

| | | |
|---|---|---|
| 6,993,973 B2 | 2/2006 | Lischer et al. |
| 7,214,908 B2 | 5/2007 | Wlodarczyk |
| 7,252,011 B2 | 8/2007 | Traverso |
| 7,443,169 B2 | 10/2008 | Bjorkman et al. |
| 7,765,874 B2 | 8/2010 | Wuest |
| 2002/0124989 A1 | 9/2002 | Kagain |
| 2003/0167852 A1* | 9/2003 | Traverso ............ G01L 19/0636 73/756 |
| 2004/0178688 A1* | 9/2004 | Ikegawa ................ F16C 17/02 310/90 |
| 2004/0185323 A1* | 9/2004 | Fowler ................ H01M 4/8605 429/440 |
| 2004/0226382 A1 | 11/2004 | Lischer et al. |
| 2005/0115326 A1* | 6/2005 | Dannhauer ......... G01L 19/0609 73/716 |
| 2006/0081043 A1* | 4/2006 | Silverbrook ........ B60C 23/0408 73/146 |
| 2006/0214202 A1* | 9/2006 | Zorich .................. G01L 9/0055 257/294 |
| 2006/0248958 A1* | 11/2006 | Betzner ............... G01L 19/0645 73/754 |
| 2008/0221500 A1 | 9/2008 | Sniegowski et al. |
| 2009/0071258 A1 | 3/2009 | Kouda et al. |
| 2011/0137236 A1 | 6/2011 | Prisco et al. |
| 2012/0318217 A1 | 12/2012 | Herrmann et al. |
| 2013/0001550 A1 | 1/2013 | Seeger et al. |
| 2014/0150559 A1 | 6/2014 | Ishihara et al. |

FOREIGN PATENT DOCUMENTS

| | | |
|---|---|---|
| WO | 2001/18516 A1 | 3/2001 |
| WO | 2001018516 A1 | 3/2001 |

OTHER PUBLICATIONS

Search Report dated Mar. 30, 2015 from corresponding Taiwan Application No. 103115693.
The Extended European Search Report (14791513.6).

* cited by examiner

MEMS PRESSURE SENSORS WITH INTEGRATED BAFFLES

CROSS-REFERENCE TO RELATED APPLICATION

This application is based upon and claims priority to U.S. provisional patent application 61/817,713, entitled "Integrated Baffle for a MEMS Sensor," filed Apr. 30, 2013. The entire content of this application is incorporated herein by reference.

BACKGROUND

Technical Field

This disclosure relates to pressure sensors for measuring the pressure of a gas or liquid, to baffles that may be used to reduce sediment deposits on the pressure sensors, and to microelectromechanical systems (MEMS).

Description of Related Art

A pressure sensor can be used to measure the pressure of a gas or liquid.

Prolonged exposure of the pressure sensor to the gas or liquid can result in the deposition of sediments on the pressure sensor. These sediments can adversely affect the accuracy of measurements made by the pressure sensor.

A baffle may be placed between the pressure sensor and the gas or liquid whose pressure is to be measured to help reduce the amount of sediment that is deposited on the pressure sensor. However, the baffle can significantly increase the effective distance between pressure sensor and the gas or liquid and, as a consequence, the response time of the pressure sensor to changes in this pressure.

SUMMARY

A pressure sensor system may sense the pressure of a gas or liquid. The system may include a housing that has an entry port for the gas or liquid; a pressure sensor within the housing; and a baffle positioned between the entry port and the pressure sensor. The baffle may have one or more inlets oriented to receive gas or liquid that enters the entry port; one or more outlets oriented to deliver the received gas or liquid to the pressure sensor; and one or more sealed flow channels that prevent the gas or liquid from escaping from the baffle, other than through the one or more outlets. One or more of the outlets may be located within no more than one millimeter of a location on the pressure sensor.

The pressure sensor may include a flexible diaphragm within the housing and a sensing system that senses changes in the diaphragm caused by changes in the pressure of the gas or liquid.

The baffle may have features that are less than 100 micrometers in length; conformal layers; and one or more layers of silicon, polysilicon, silicon oxide, silicon nitride, alumina, sapphire, nickel, or nickel alloy.

The baffle may have multiple layers, each with at least one hole through it.

The sealed flow channels may force the gas or liquid to change directions while traveling through the baffle.

The baffle may have a layer and the sealed flow channels may force the gas or liquid to travel through the layer in opposite directions.

The sealed flow channels may require all portions of the gas or liquid to make one or more turns as they travel from the inlets to the outlets that have a turning radius of no more than fifty micrometers.

The sealed flow channels may have an electric field through which the gas or liquid must pass when a voltage potential is applied to the baffle.

At least a portion of the sealed flow channels may be coated with an impurity-absorbing material.

The pressure sensor system may generate an electric field between the baffle and the pressure sensor when a voltage potential is applied between the baffle and pressure sensor.

A process for making a product that includes a baffle may include depositing, pattering, etching, wafer bonding, and/or wafer thinning a series of layers in a manner that creates a baffle that has one or more inlets for receiving a gas or liquid, one or more outlets for delivering the received gas or liquid, and one or more sealed flow channels for the gas or liquid to travel from the inlets to the outlets.

The product may be a pressure sensor system and one of the layers that is produced by the depositing, pattering, etching, wafer bonding, and/or wafer thinning may be a flexible diaphragm that is spaced from the baffle.

The process may include computing a separation distance between the baffle and the diaphragm; and depositing, pattering, etching, wafer bonding, and/or wafer thinning a series of layers in a manner that causes the baffle and the diaphragm to be separated by substantially the computed separation distance.

The process may include computing a length and cross-sectional area of the sealed flow channel that collectively cause the pressure sensor to have a desired response time to changes in the pressure of the gas or liquid; and depositing, pattering, etching, wafer bonding, and/or wafer thinning a series of layers in a manner that causes the baffle to have the computed length and cross-sectional area.

One of the layers that is produced by the depositing, pattering, etching, wafer bonding, and/or wafer thinning may be an electrode that is spaced from the diaphragm and that is not part of the baffle.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
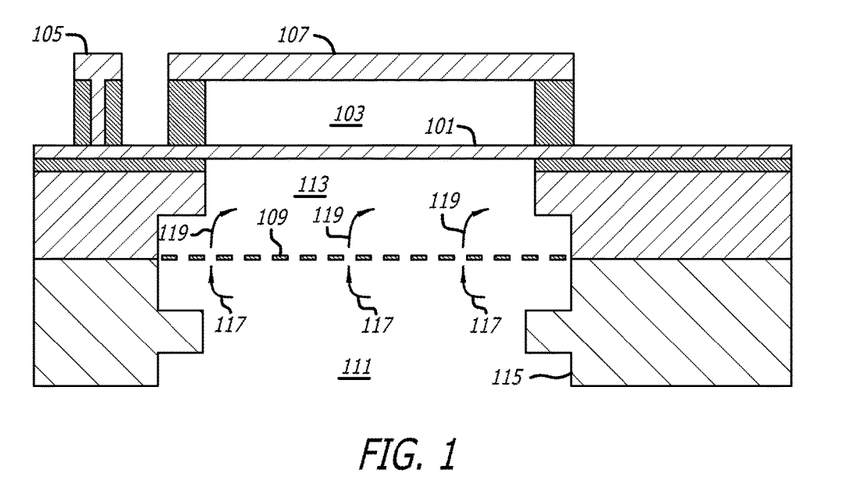
FIG. 1 illustrates a cross-sectional view of an example of a pressure sensor system that includes a pressure sensor and an integrated baffle, both made by depositing, pattering, etching, wafer bonding, and/or wafer thinning a series of layers on a common substrate using microelectromechanical systems (MEMS) technology.

FIG. 1 illustrates a cross-sectional view of an example of a pressure sensor system that includes a pressure sensor and an integrated baffle, both made by depositing, patterning, etching, wafer bonding, and/or wafer thinning a series of layers on a common substrate using microelectromechanical systems (MEMS) technology.

The pressure sensor may be of any type. For example, the pressure sensor may include a flexible diaphragm 101, a pressure reference cavity 103, and electrodes 105 and 107.

The baffle may be of any type and is generally indicated as a baffle 109. Various examples of such a baffle are illustrated in FIGS. 2A-2I, FIGS. 3A-3D, and in FIGS. 4A-4F and discussed below.

The pressure or gas may enter an entry port 111, pass through the baffle 109, and then travel to a wet side of the flexible diaphragm 101. The pressure in the pressure reference cavity 103 may be constant, thereby causing the flexible diaphragm 101 to deflect when the pressure of gas or liquid to be measured is different than the pressure in the pressure reference cavity 103. The direction of the deflection may depend on whether the pressure of the gas or liquid to be measured is greater or less than the pressure in the pressure reference cavity 103.

The flexible diaphragm 101, the pressure reference cavity 103, and the electrodes 105 and 107 may cooperate to form a capacitor whose capacitance varies as the flexible diaphragm 101 flexes in response to changes in the pressure of the gas or liquid. Other techniques may be used to measure flexing of the flexible diaphragm 101 in addition or instead, including piezoresistive, piezoelectric, or resonant techniques.

The baffle 109 may be monolithically constructed very close to the surface of the flexible diaphragm 101, such as within no more than one millimeter, a half millimeter, or a quarter millimeter. This may minimize the volume of a cavity 113 between the baffle 109 and the flexible diaphragm 101 and hence the response time of the pressure sensor system to changes in the pressure of the gas or liquid.

The baffle 109 may be fabricated at the same time as the components of the pressure sensor by depositing, patterning, etching, wafer bonding, and/or wafer thinning a series of layers on a common substrate 115 using microelectromechanical systems (MEMS) technology. The substrate may be of any type, such as silicon, glass, or sapphire. The baffle 109 may be physically connected and monolithically constructed without requiring assembly.

The baffle 109 may be made of any material, such as silicon, polysilicon, silicon oxide, silicon nitride, alumina, sapphire, nickel, or nickel alloy, stainless steel, AlN, TiN, and/or ceramic.

The baffle 109 may be conductive.

The baffle 109 may be sealed such that the gas or liquid may only flow through one or more sealed flow channels between the one or more inlets 117 and the one or more outlets 119.

The baffle 109 may have features that are less than 100 micrometers in length and may be made in conformal layers.

The baffle 109 may have multiple layers with at least one hole in each layer.

One or more sealed flow channels may be provided within the baffle 109. These sealed flow channels may require the gas or liquid to change directions one or more times when traveling from the one or more inlets 117 to the one or more outlets 119. The flow channels may require the gas or liquid to travel in different directions that are all parallel, perpendicular, and/or at any other angle with respect to the flow path from the one or more inlets 117 to the one or more outlets 119. The flow channels may require the gas or liquid to travel in multiple directions through a single layer of the baffle 109 and/or in multiple directions between two neighboring layers. When changing directions, the turning radius may be no more than fifty micrometers.

The pressure sensor system may have a configuration that generates an electric field when a voltage potential is applied. This electric field may be between the baffle 109 and pressure sensor, such as between the baffle 109 and the flexible diaphragm 101, and/or within all or any portion of the sealed channels within the baffle 109. The sealed flow channels may have one or more electric fields through which all of the gas or liquid must pass when a voltage potential is applied to the baffle.

An impurity-absorbing material may be positioned within the pressure sensor system, such as within the cavity 113, to absorb impurities in the gas or liquid. The impurity-absorbing material may be coated on one or more of the layers or on any portion thereof.

FIGS. 2A-2I illustrates cross-sectional views of examples of different MEMS baffles 201A-201I, respectively, any one of which may be used as the baffle 109 illustrated in FIG. 1. Any of these MEMS baffles 201A-201I may in addition or instead be used in a pressure sensor system that is different from the one illustrated in FIG. 1.

Figure 2A:
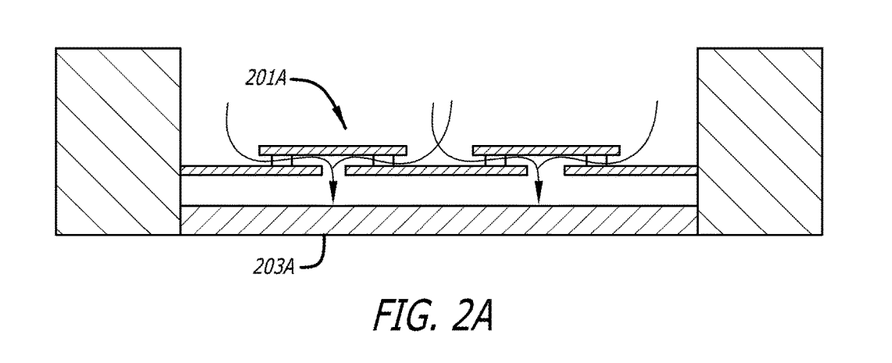
FIGS. 2A-2I illustrates cross-sectional views of examples of different MEMS baffles, any one of which may be used as the baffle illustrated in FIG. 1.
Figure 2B:
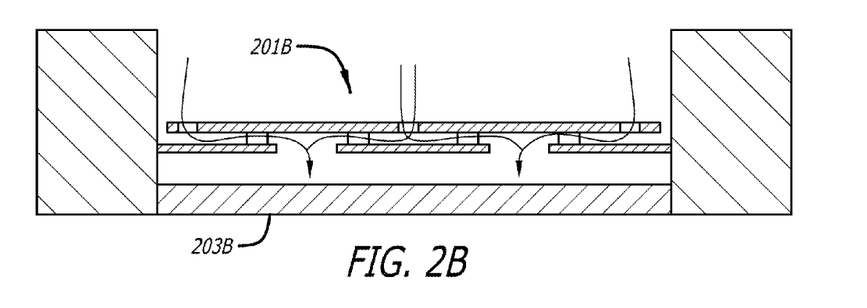
Figure 2C:
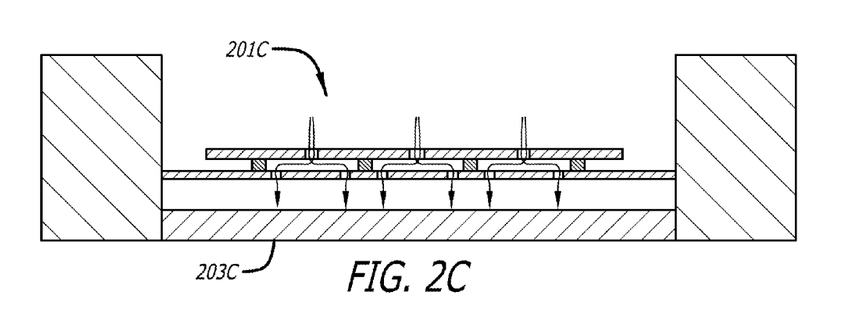
Figure 2D:
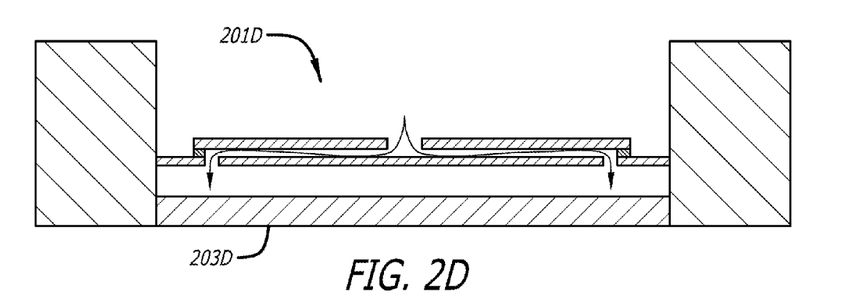
Figure 2E:
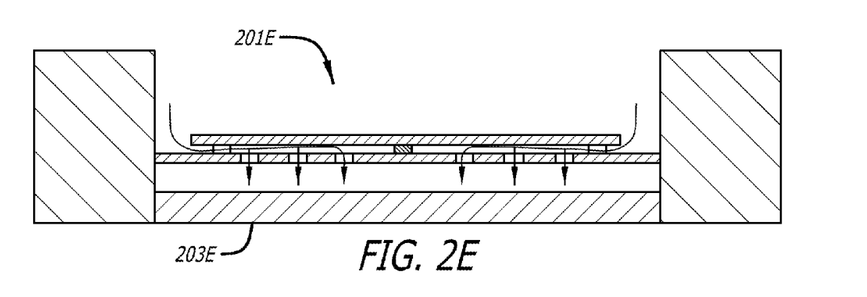
Figure 2F:
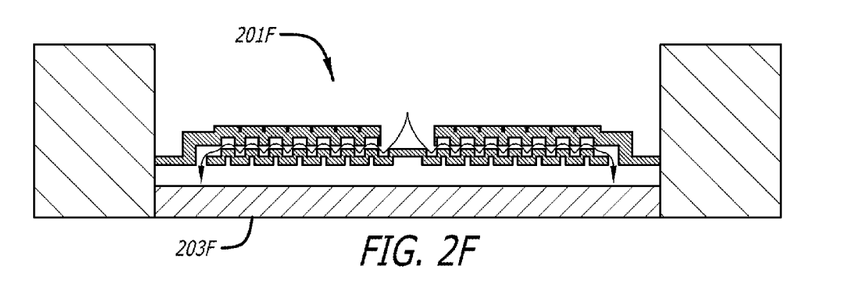
Figure 2G:
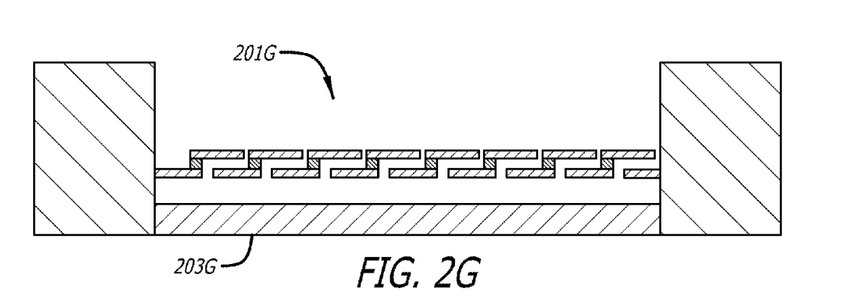
Figure 2H:
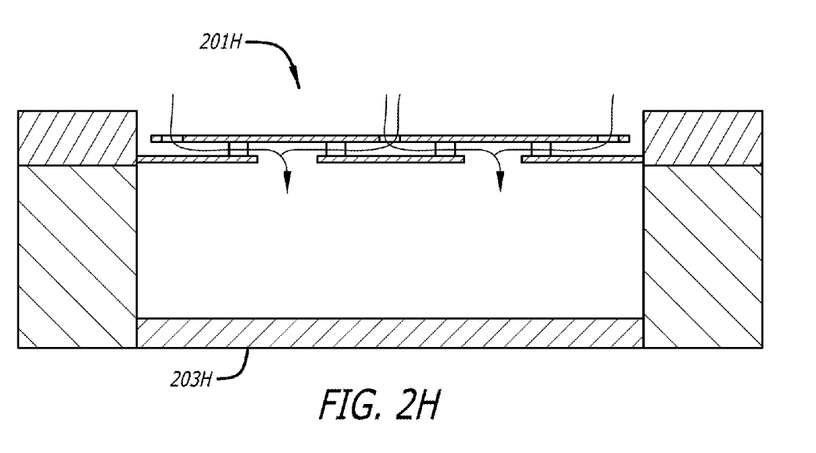
Figure 2I:
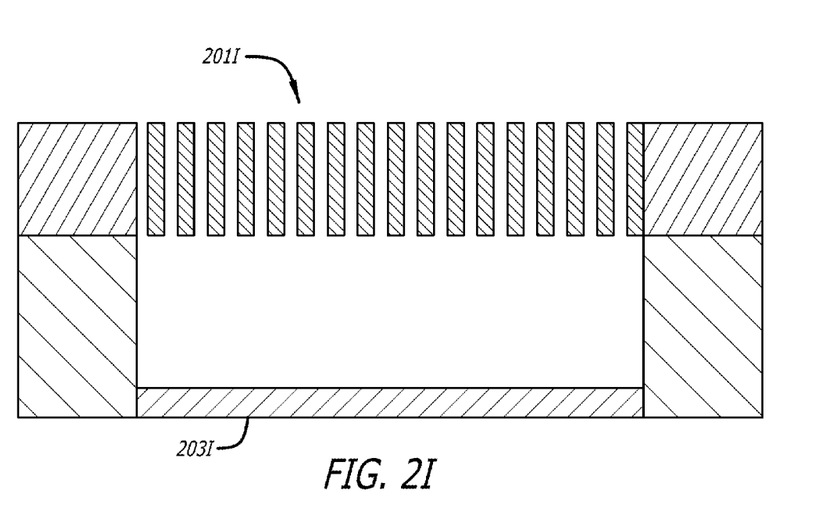
Figure 3A:
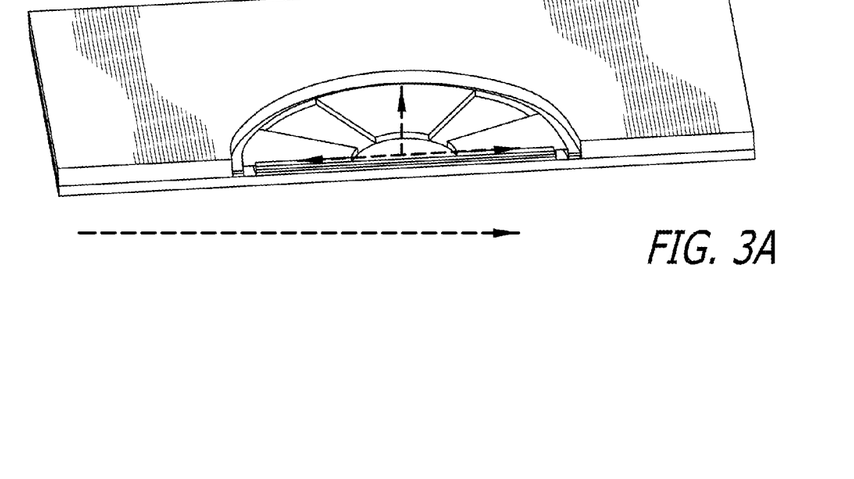
FIGS. 3A-3D illustrate perspective views of examples of different MEMS baffles, any one of which may be used as the baffle illustrated in FIG. 1.
Figure 3B:
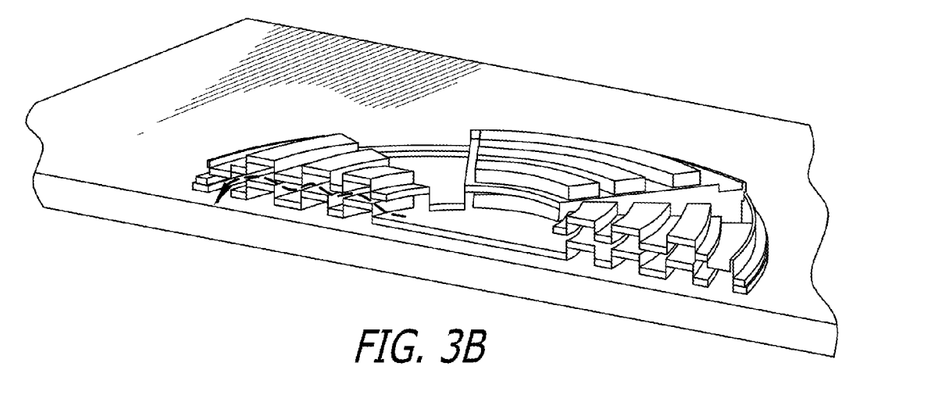
Figure 3C:
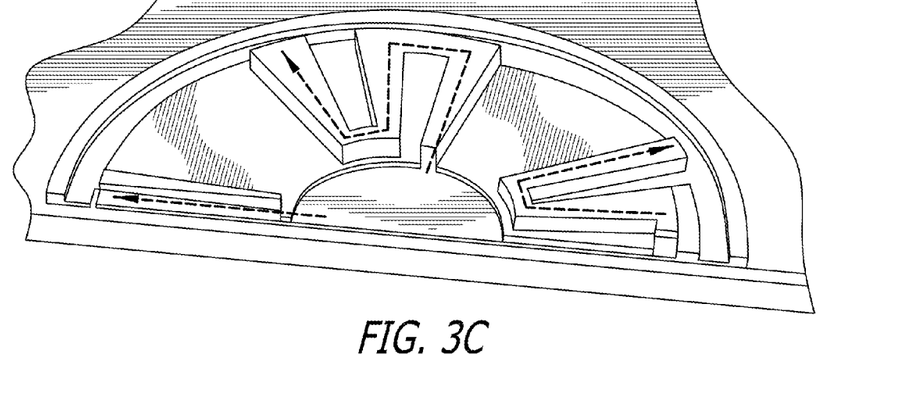
Figure 3D:
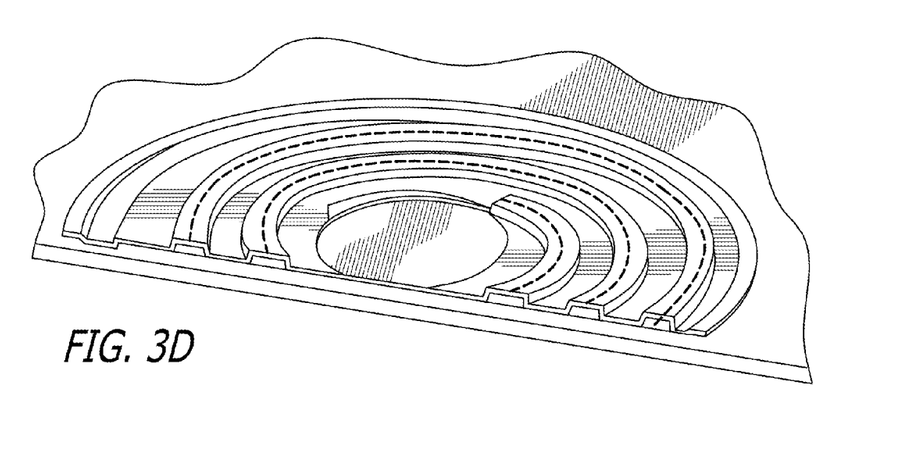

Each of the MEMS baffles 201A-201G that are illustrated in FIGS. 2A-2G may be formed on the same wafer as the pressure sensor, as illustrated in FIG. 1. FIGS. 2H and 2I illustrate MEMS baffles 201H and 201I, respectively, that may each be formed on a separate wafer and attached to a pressure sensor wafer. The embodiments shown in FIGS. 2A-2G may also be formed on a separate wafer.

Arrows within each of FIGS. 2A-2I illustrate example flow pathways that the gas or liquid may travel when traveling through the flow channels in the illustrated baffle. The direction of travel is reversed from what is shown in FIG. 1. It goes from the top of each figure to a flexible diaphragm 203A-203I, respectively, at the bottom of each figure.

FIGS. 3A-3D illustrate perspective views of examples of different MEMS baffles, any one of which may be used as the baffle illustrated in FIG. 1. Again, arrows within each of the figures illustrate example flow pathways that the gas or liquid may travel when traveling through the flow channels in the illustrated baffle.

Each baffle may have multiple layers that may be arranged to have individually controlled electric potentials.

Each baffle may be electrically isolated from the flexible diaphragm so that it does not induce an electrostatic pressure or a parasitic capacitive load on the flexible diaphragm.

The baffle layers may be energized in such a way as to electrostatically capture impurities in the gas or liquid that might otherwise deposit on the flexible diaphragm.

The voltage on a baffle that is directly adjacent to the flexible diaphragm may be adjusted to adjust the zero point of the flexible diaphragm.

FIGS. 4A-4F illustrate an example of a process for making an example of a pressure sensor system that includes a pressure sensor and a baffle by depositing, patterning, and/or etching a series of layers on a common substrate using microelectromechanical systems (MEMS) technology.

Figure 4A:
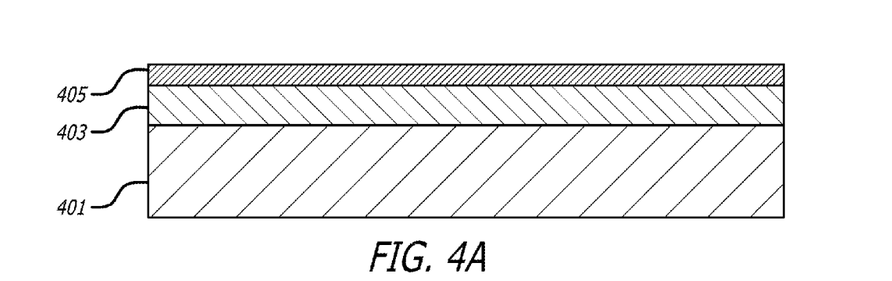
FIGS. 4A-4F illustrate an example of a process for making an example of a pressure sensor system that includes a pressure sensor and a baffle by depositing, patterning, and/or etching a series of layers on a common substrate using microelectromechanical systems (MEMS) technology.
Figure 4B:
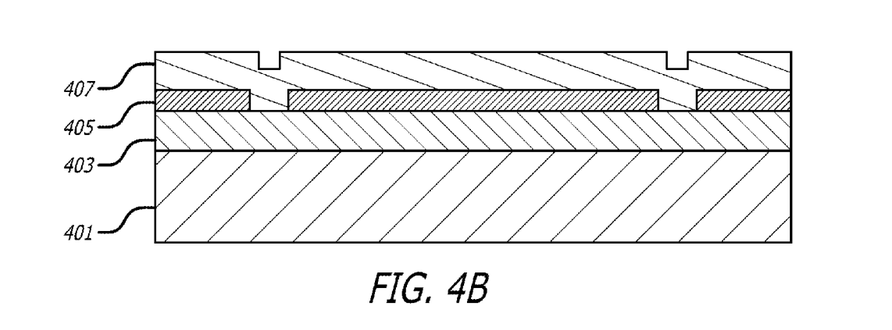
Figure 4C:
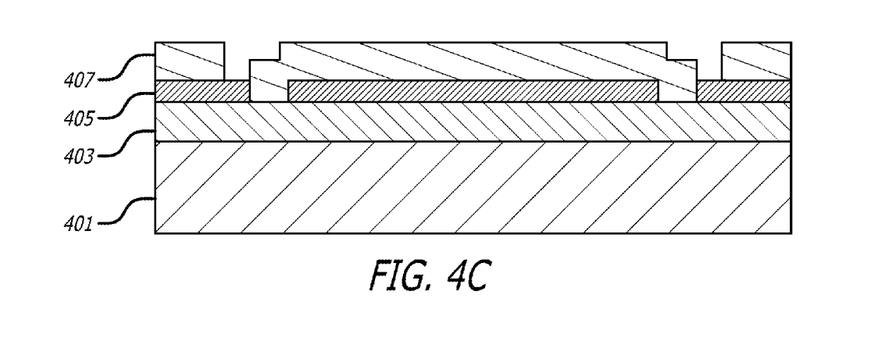
Figure 4D:
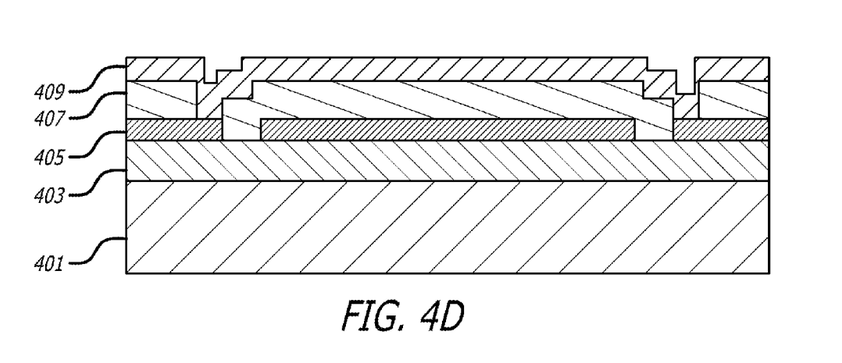
Figure 4E:
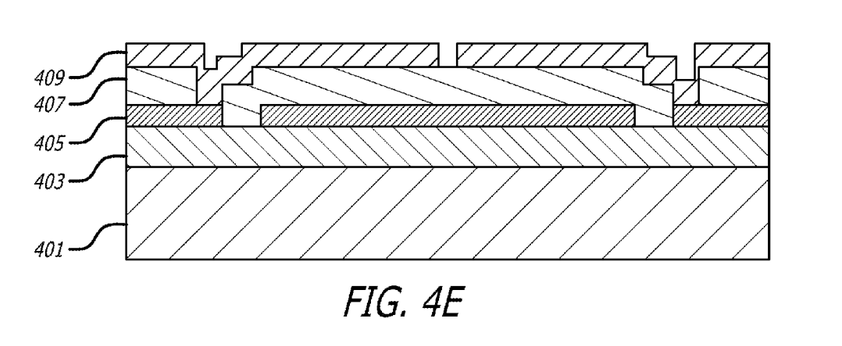
Figure 4F:
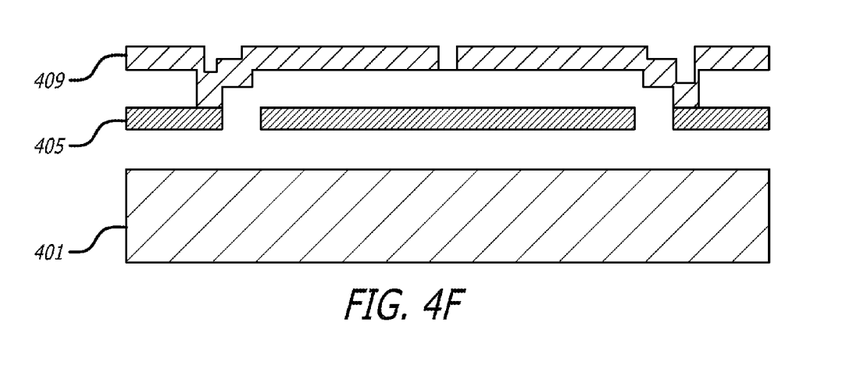

The process may begin with a layer defining a silicon diaphragm 401, a sacrificial layer 403, and a structural layer 405 sandwich structure, as illustrated in FIG. 4A. The structural layer 405 may be any depositable thin-film material that can withstand the etching process that removes the sacrificial layer 403, such as polysilicon. The structural layer 405 may be patterned and then covered by a second sacrificial layer 407, as illustrated in FIG. 4B. The second sacrificial layer 407 may be selectively etched such that the etch stops on the first structural layer 405, as illustrated in FIG. 4C. A second polysilicon layer 409 may then be deposited, as illustrated in FIG. 4D, and then patterned with flow channels and release holes, as illustrated in FIG. 4E. All of the sacrificial layers may then be removed. The completed baffle may then be suspended on top of a flexible diaphragm, as illustrated in FIG. 4F.

The process may include computing a desired separation distance between the baffle and the diaphragm. The depositing, patterning, etching, wafer bonding, and/or wafer thinning a series of layers may be done in a manner that causes the baffle and the diaphragm to be separated by substantially the computed separation distance.

The process may include computing a length and cross-sectional area of the sealed flow channel that collectively cause the pressure sensor to have a desired response time to changes in the pressure of the gas or liquid. The depositing, patterning, etching, wafer bonding, and/or wafer thinning a series of layers may be done in a manner that causes the baffle to have the computed length and cross-sectional area.

The pressure sensor systems that have been described may be used in any application, such as in semiconductor deposition processes, such as CVD reaction systems. In such systems, baffles may be provided and an integrated baffle/sensor assembly may significantly improve the long term stability of the sensor, while maximizing response times.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A pressure sensor system for sensing the pressure of a gas or liquid comprising:
   a housing having an entry port for the gas or liquid;
   a pressure sensor within the housing; and
   a baffle that has multiple layers and is positioned between the entry port and the pressure sensor, wherein each of the multiple layers has two lateral faces and is connected to at least one other layer, and wherein pairs of adjacent layers are directly connected to each other at respective lateral faces, the baffle having:
      one or more inlets oriented to receive gas or liquid that enters the entry port;
      one or more outlets oriented to deliver the received gas or liquid to the pressure sensor; and a plurality of discrete sealed flow channels passing through the multiple layers via one or more apertures in each respective layer, and wherein the plurality of sealed flow channels connect the one or more inlets to the one or more outlets and prevent the gas or liquid from escaping from the baffle, other than through the one or more outlets or the one or more inlets, wherein the one or more outlets are located within no more than one millimeter of a respective location on the diaphragm of the pressure sensor.

2. The pressure sensor system of claim 1 wherein the pressure sensor includes:
a flexible diaphragm within the housing; and
a sensing system having a configuration that senses changes in the diaphragm caused by changes in the pressure of the gas or liquid.

3. The pressure sensor system of claim 1 wherein the baffle has:
features that are less than 100 micrometers in length;
conformal layers; and
one or more layers of silicon, polysilicon, silicon oxide, silicon nitride, alumina, sapphire, nickel, or nickel alloy.

4. The pressure sensor system of claim 1 wherein the baffle has multiple layers, each with at least one hole through it.

5. The pressure sensor system of claim 1 wherein the sealed flow channels force the gas or liquid to change directions while traveling through the baffle.

6. The pressure sensor system of claim 5 wherein the baffle has a layer and the sealed flow channels force the gas or liquid to travel through the layer in opposite directions.

7. The pressure sensor system of claim 1 wherein the sealed flow channels include one or more turns as they travel from the inlets to the outlets, wherein each of the turns has a turning radius of no more than fifty micrometers.

8. The pressure sensor system of claim 1 wherein at least a portion of the sealed flow channels are coated with an impurity-absorbing material.

9. The pressure sensor system of claim 1 wherein the pressure sensor has a configuration that generates an electric field between the baffle and the pressure sensor when a voltage potential is applied between the baffle and pressure sensor.

10. The pressure sensor system of claim 1 wherein the baffle is electrically isolated from the diaphragm.

11. The pressure sensor system of claim 1 wherein the baffle layers are configured to be energized so as to electrostatically capture impurities in the gas or liquid.

12. The pressure sensor system of claim 1 wherein the system is configured to use a voltage on the baffle, directly adjacent the diaphragm, to adjust a zero point of the diaphragm.

13. The pressure sensor system of claim 1 wherein the one or more apertures in each of the multiple layers of the baffle are offset with respect to the one or more apertures in each adjacent layer of the baffle.

14. A process for making a product that includes a baffle that has multiple layers, the process comprising:
depositing, patterning, etching, wafer bonding, or wafer thinning a series of layers in a manner that creates a baffle that has multiple layer, wherein each of the multiple layers has two lateral faces and is connected to at least one other layer, and wherein pairs of adjacent layers are directly connected to each other at respective lateral faces, and wherein the baffle includes:
one or more inlets for receiving a gas or liquid;
one or more outlets for delivering the received gas or liquid; and
a plurality of discrete sealed flow channels passing through one or more apertures in each of the multiple layers and configured to permit the gas or liquid to travel from the inlets to the outlets and prevent the gas or liquid from escaping from the baffle, other than through the one or more outlets or the one or more inlets.

15. The process of claim 14 wherein the baffle includes:
features that are less than 100 micrometers in length;
conformal layers; and
one or more layers of silicon, polysilicon, silicon oxide, silicon nitride, alumina, sapphire, nickel, or nickel alloy.

16. The process of claim 14 wherein the sealed flow channels include one or more turns as they travel from the inlets to the outlets, wherein each of the turns has a turning radius of no more than fifty micrometers.

17. The process of claim 14 further comprising coating at least a portion of the baffle with an impurity-absorbing material.

18. The process of claim 14 wherein the product is a pressure sensor system and wherein one of the layers that is produced by the depositing, patterning, etching, wafer bonding, or wafer thinning is a flexible diaphragm that is spaced from the baffle.

19. The process of claim 18 wherein at least one of the outlets of the baffle is spaced no more than one millimeter from a location on the diaphragm.

20. The process of claim 18 further comprising:
computing a separation distance between the baffle and the diaphragm; and
depositing, patterning, etching, wafer bonding, or wafer thinning a series of layers in a manner that causes the baffle and the diaphragm to be separated by substantially the computed separation distance.

21. The process of claim 18 further comprising:
computing a length and cross-sectional area of the sealed flow channel that collectively cause the pressure sensor to have a desired response time to changes in the pressure of the gas or liquid; and
depositing, patterning, etching, wafer bonding, or wafer thinning a series of layers in a manner that causes the baffle to have the computed length and cross-sectional area.

22. The process of claim 18 wherein one of the layers that is produced by the depositing, pattering, etching, wafer bonding, or wafer thinning is an electrode that is spaced from the diaphragm and that is not part of the baffle.

23. A product that includes a baffle that has multiple layers, wherein each of the multiple layers has two lateral faces and is connected to at least one other layer, and wherein pairs of adjacent layers are directly connected to each other at respective lateral faces, the baffle having:
one or more inlets oriented to receive a gas or liquid;
one or more outlets oriented to deliver received gas or liquid;
a plurality of discrete sealed flow channels passing through one or more apertures in each of the multiple layers, wherein the plurality of sealed flow channels prevent the gas or liquid from escaping from the baffle other than through the one or more outlets or the one or more inlets, wherein the sealed flow channels include one or more turns as they travel from the inlets to the outlets, wherein the turns have a turning radius of no more than one hundred micrometers;

features that are less than one hundred microns in length;

conformal layers; and one or more layers of silicon, polysilicon, silicon oxide, silicon nitride, alumina, sapphire, nickel, or nickel alloy.

24. The product of claim 23 wherein the sealed flow channels have a configuration that generates an electric field through which the gas or liquid must pass when a voltage potential is applied to the baffle.

25. The product of claim 23 wherein the product is a pressure sensor system for sensing the pressure of a gas or liquid and the product further comprises:

a housing having an entry port for the gas or liquid;

a flexible diaphragm within the housing; and a sensing system having a configuration that senses changes in the diaphragm caused by changes in the pressure of the gas or liquid, wherein the baffle is positioned between the entry port and the flexible diaphragm.

26. The product of claim 25 wherein the pressure sensor has a configuration that generates an electric field between the baffle and the diaphragm when a voltage potential is applied between the baffle and the diaphragm.

27. A baffle comprising:

a plurality of layers physically connected together, wherein each of the plurality of layers has two lateral faces and is connected to at least one other layer, and wherein pairs of adjacent layers are directly connected to each other at respective lateral faces;

one or more inlets oriented to receive a gas or liquid;

one or more outlets oriented to deliver received gas or liquid; and a plurality of discrete sealed flow channels passing through one or more apertures in each of the multiple layers, wherein the one or more sealed flow channels permit the gas or liquid to travel from the one or more inlets to the one or more outlets, and wherein the plurality of discrete sealed flow channels prevent the gas or liquid from escaping from the plurality of layers other than through the one or more outlets or the one or more inlets, each sealed flow channel including one or more turns as it travels from the one or more inlets to the one or more outlets, wherein each turn has a turning radius of no more than one hundred micrometers.

28. The baffle of claim 27 wherein the turning radius is no more than fifty micrometers.

29. The baffle of claim 27 wherein the sealed flow channels have a configuration that generates an electric field through which the gas or liquid must pass when a voltage potential is applied to the baffle.

* * * * *